(12) United States Patent
Yoshikawa (10) Patent No.: US 7,484,041 B2
(45) Date of Patent: Jan. 27, 2009

(54) SYSTEMS AND METHODS FOR LOADING DATA INTO THE CACHE OF ONE PROCESSOR TO IMPROVE PERFORMANCE OF ANOTHER PROCESSOR IN A MULTIPROCESSOR SYSTEM

(75) Inventor: Takashi Yoshikawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 11/098,109

(22) Filed: Apr. 4, 2005

(65) Prior Publication Data

US 2006/0224831 A1    Oct. 5, 2006

(51) Int. Cl.
*G06F 9/38* (2006.01)

(52) U.S. Cl. .................... 711/137; 711/130; 711/213; 712/207

(58) Field of Classification Search ................. 711/124, 711/133, 144
See application file for complete search history.

(56) References Cited

U.S. PATENT DOCUMENTS

| | | | |
|---|---|---|---|
| 5,317,716 A * | 5/1994 | Liu .............................. | 711/144 |
| 5,943,684 A * | 8/1999 | Arimilli et al. .............. | 711/144 |
| 6,349,137 B1 * | 2/2002 | Hunt et al. ............ | 379/265.06 |
| 6,453,389 B1 * | 9/2002 | Weinberger et al. ......... | 711/137 |
| 6,470,427 B1 * | 10/2002 | Arimilli et al. .............. | 711/137 |
| 6,519,685 B1 * | 2/2003 | Chang ......................... | 711/141 |
| 6,587,924 B2 | 7/2003 | Arimilli et al. | |
| 6,922,753 B2 * | 7/2005 | Brown et al. ................ | 711/137 |
| 7,159,077 B2 * | 1/2007 | Tu et al. ...................... | 711/124 |
| 2005/0134685 A1 * | 6/2005 | Egnal et al. ................. | 348/157 |
| 2006/0184742 A1 * | 8/2006 | Clark et al. .................. | 711/133 |

OTHER PUBLICATIONS

Jim Handy, "The Cache Memory Book," Academic Press, ISBN 0-12-322980-4, p. 207, 1998.*
Tendler et al; "Power4 System Microarchitecture;" IBM Technical White Paper; Oct. 2001.

* cited by examiner

*Primary Examiner*—Kevin L Ellis
*Assistant Examiner*—Alan M Otto
(74) *Attorney, Agent, or Firm*—Law Offices of Mark L. Berrier (57) ABSTRACT

Systems and methods for improving the performance of a multiprocessor system by enabling a first processor to initiate the retrieval of data and the storage of the data in the cache memory of a second processor. One embodiment comprises a system having a plurality of processors coupled to a bus, where each processor has a corresponding cache memory. The processors are configured so that a first one of the processors can issue a preload command directing a target processor to load data into the target processor's cache memory. The preload command may be issued in response to a preload instruction in program code, or in response to an event. The first processor may include an explicit identifier of the target processor in the preload command, or the selection of the target processor may be left to another agent, such as an arbitrator coupled to the bus.

20 Claims, 5 Drawing Sheets

SYSTEMS AND METHODS FOR LOADING DATA INTO THE CACHE OF ONE PROCESSOR TO IMPROVE PERFORMANCE OF ANOTHER PROCESSOR IN A MULTIPROCESSOR SYSTEM

BACKGROUND

1. Field of the Invention

The invention relates generally to computing systems, and more particularly to systems and methods for improving the efficiency of multiprocessor systems by enabling a first processor to direct data to be loaded into the cache memory of a different processor and thereafter providing the data directly from the second processor to the first processor through intervention.

2. Related Art

As the complexity of data processing applications increases, there is a need for increased processing power. This need for increased processing power drives the development of new technologies and new techniques for using existing technologies.

The need for increased processing power can be addressed in a number of ways. For example, it may be possible to increase the clock speed of a processor and the corresponding number of instructions that can be executed by the processor in a given amount of time. Another way to improve the performance of a processor is to improve the performance of other systems that interact with the processor. For instance, the speed with which data can be accessed in a memory system can be increased (e.g., by caching data,) thereby reducing the amount of time spent by a processor waiting for data to be accessed and increasing the throughput that can be achieved by the processor.

Another way to increase the processing power of a computing system is to use multiple processors rather than providing a single processor to execute an application. While the performance of each individual processor may not be improved, there are more processors (hence more processing power) available to execute the application. It may be convenient to use multiple processors to execute applications such as multimedia applications because of the many different types of tasks that may need to be performed and the ability to configure the different processors so that they are optimized to perform these different tasks.

Some of these techniques can be combined with others, or can be used in different ways to further improve the performance of a computing system. In one system, multiple processors can be provided. Each of the processors in this multi-processor system may have a cache memory that is configured to store data that has recently been used by the processor. Because of the likelihood that recently used data will be used again by the processor in the near future, storing this data in the cache memory makes the data more readily available to the processor. That is, the data can be retrieved more quickly from the cache memory than from a main memory. The latency of the data (the time required to retrieve the data) is thereby reduced. In some multi-processor systems, each processor can also retrieve data from the caches of the other processors in the system, which can also reduce the latency of the data.

Another technique that can be used to improve the performance of the processors in the multi-processor system described above is to enable prefetching of data that will be needed by the processors. If it can be determined that particular data will be needed by a processor prior to execution of the instruction that actually uses the data, the data can be retrieved prior to execution of the instruction. The retrieved data can be stored in the processor's cache memory so that it is available for quick access by the processor.

While several techniques to improve the performance of the multi-processor system are described above, there are some limitations on the improvement that is possible. One shortcoming in particular is the fact that the technique of prefetching data is limited to a processor's own cache memory. In other words, when a particular processor prefetches data, the data can only be stored in the cache owned by the processor. While some conventional multi-processor systems enable their processors to use data stored in other processors' cache memories, these systems do not allow the processors to store data in the other processors' cache memories. This limits the usefulness of the ability to use the data in other processors' cache memories. This also limits the usefulness of caching in the first processor when, for example, a general load instruction causes data to be cast out of the processor's cache memory (i.e., the cast out data cannot be stored by the processor in another processor's cache memory.)

It would therefore be desirable to provide systems and methods for enabling processors in a multiprocessor system to load data into the cache memories of other processors.

SUMMARY OF THE INVENTION

One or more of the problems outlined above may be solved by the various embodiments of the invention. Broadly speaking, the invention includes systems and methods for improving the performance of a multiprocessor system by enabling a first processor to initiate the retrieval of data and the storage of the data in the cache memory of a second processor. In one embodiment, this is achieved through the use of a preload function in a multiprocessor system that supports intervention (the transfer of data from the cache of one processor to another processor.) The preload function is similar to a prefetch function, except that a prefetch of data is initiated by a processor to retrieve data and store the data in the cache memory of that same processor, while a preload the data is initiated by a processor to retrieve data and store the data in the cache memory of a different processor. The data can then be used by the first processor.

One embodiment comprises a system which includes a plurality of processors, each of which has a corresponding cache memory. Each of the processors is coupled to a bus. The processors are configured so that a first one of the processors can issue a preload command to the bus. The preload command directs one of the other processors (a target processor) to load data into the cache memory of the target processor. The first processor may issue the preload command in response to receiving a preload instruction in program code, or in response to an event, such as the casting of data out of the first processor's cache memory. The first processor may include an explicit identifier of the target processor in the preload command, or the selection of the target processor may be left to another agent, such as an arbitrator coupled to the bus. At some time after the data is loaded into the cache memory of the target processor, the data may be provided directly from the target processor to the first processor through intervention.

An alternative embodiment comprises a processor that is configured to be coupled to a bus in a multiprocessor system. The processor is configured to operate in either a master mode or a slave mode. In the master mode, the processor can issue a preload command to load data into the cache memory of a different processor. In the slave mode, the processor can load data into its own cache memory in response to a preload command issued by a different processor.

Another alternative embodiment comprises a method implemented in a multiprocessor system. Each processor has a corresponding cache memory and is coupled to a bus. The method includes a first one of the processors issuing a preload command to the bus, and loading data into the cache memory of one of the other processors (the target processor) in response to the preload command. The preload command may be issued in response to execution of a preload instruction in program code, or in response to an event, such as the casting of data out of a processor's cache memory. The preload command may be issued with an explicit identifier of the target processor. Alternatively, the selection of the target processor may be left to another agent, such as an arbitrator coupled to the bus. The method may include providing the data directly from the target processor to the processor issuing the preload command at some time after the data is loaded into the cache memory of the target processor.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for improving the performance of a multiprocessor system which is configured to support intervention—the direct transfer of data from the cache of one processor in the system to another processor in the system. The performance of the system is improved by enabling a first processor to initiate the retrieval of data and the storage of the data in the cache memory of a second processor. The data can then be transferred to and used by the first processor.

In one embodiment, a preload function is implemented in the multiprocessor system to provide that capability of a first processor loading data into the cache of a different processor. The preload function is similar to a prefetch function, except that a prefetch of data is initiated by a processor to retrieve data and store the data in the cache memory of that same processor, while a preload the data is initiated by a processor to retrieve data and store the data in the cache memory of a different processor.

In this embodiment, the transactions that are carried out between the processors (or between various devices on the bus) are split transactions. That is, the transactions occur in phases. The preload transaction includes the following phases: issuance of the preload command by a first processor; reflection of the preload command to all of the devices on the bus; all of the devices on the bus responding to the preload command; generation of a combined or accumulated response to the preload command; one of the devices sending preload data to the bus; and one of the devices receiving the preload data from the bus and loading the data into its cache.

The preload transaction can be used to make data more readily available to a processor by loading the data into the cache of one of the other processors (as compared to having to access the data from a main memory.) The preload transaction can also be used to retain data in the cache of one of the processors when the data would otherwise be "cast out," or replaced by more recently used data. The preload transaction can include explicit identification of a target device, or it can direct to the loading of the data to any available device. The transaction may be initiated by a preload program instruction, or by the occurrence of a triggering event (e.g., desired data being cast out of a cache.)

Figure 1:
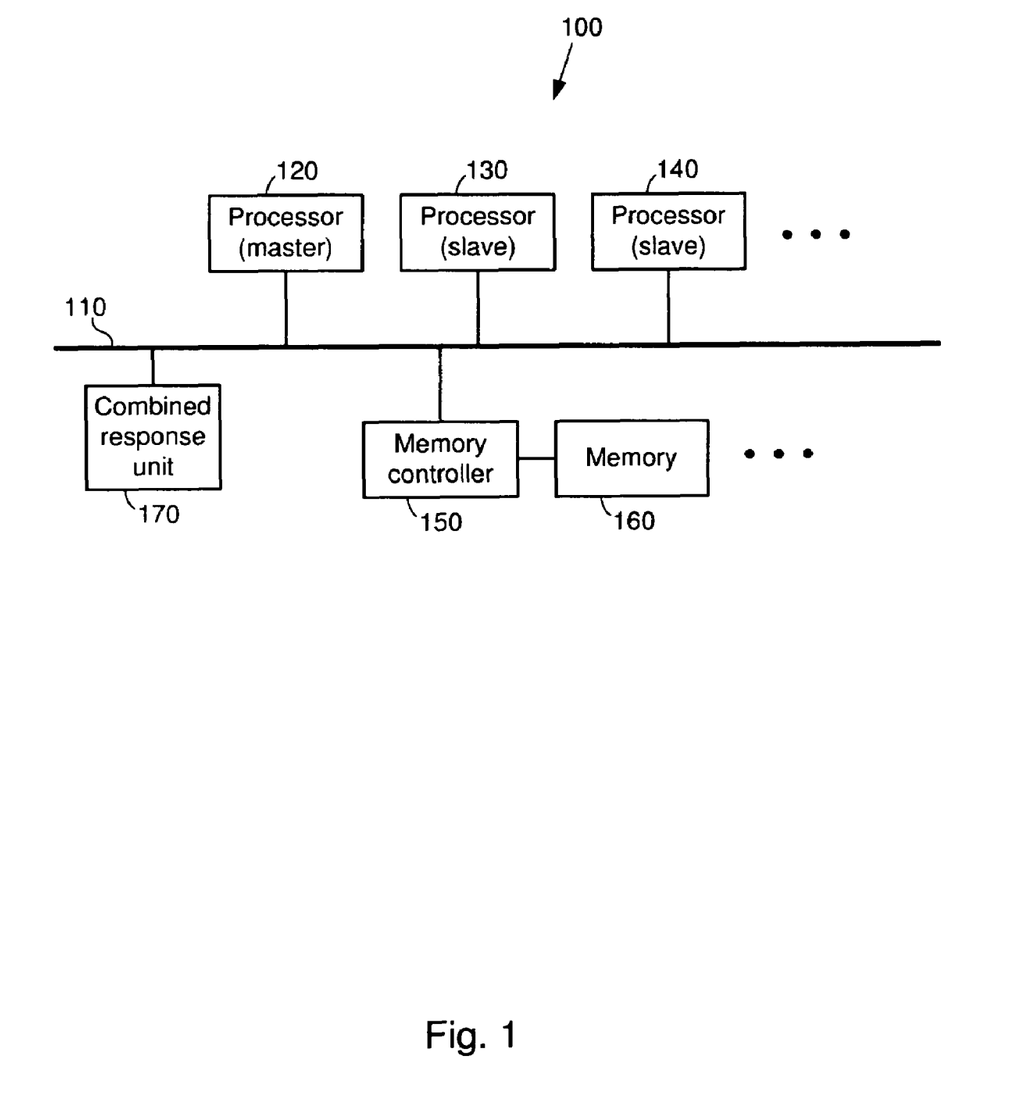
FIG. 1 is a functional block diagram illustrating the structure of a multiprocessor system in accordance with one embodiment.

Before describing the preload transaction in detail, it will be helpful to discuss the basic structure and operation of the multiprocessor system. Referring to FIG. 1, a functional block diagram illustrating the structure of a multiprocessor system in accordance with one embodiment is shown. In this embodiment, system 100 includes a split transaction bus 110 and a set of devices that are coupled to the bus. These devices include processors 120, 130 and 140, as well as various other devices such as memory controller 150 and memory 160. System 100 also includes a combined response unit 170 that is coupled to bus 110.

The devices coupled to bus 110 include both master and slave devices. Some of the devices may be either a master or a slave, depending upon the transaction. Typically, a device initiating a transaction is referred to as a master, and a device responding to the transaction is referred to as a slave. It should be noted that, in the embodiments described below, each of the processors may be assumed to operate in either a first mode in which the processor acts as a master or a second mode in which the processor acts as a slave.

As depicted in FIG. 1, processor 120 is a master device, while processors 130 and 140 are slave devices. Processor 120 may, for instance, be a primary processor that is configured to manage the execution of software applications, while processors 130 and 140 may be sub-processors or co-processors that are configured to support the execution of these applications. Memory controller 150 and memory 160 may likewise be configured to support the processing that is managed by processor 120. It should be noted that, in this embodiment, memory 160 is coupled to bus 110 through memory controller 150, and these two components of the system may be treated as a single slave.

Combined response unit 170 is not identified in FIG. 1 as either a master device or a slave device. In this embodiment, combined response unit 170 is not designed to directly support the processing of the applications executing in system 100, but is instead designed to facilitate communication between the master and slave devices that are coupled to bus 110. This will be explained in more detail below.

Figure 2:
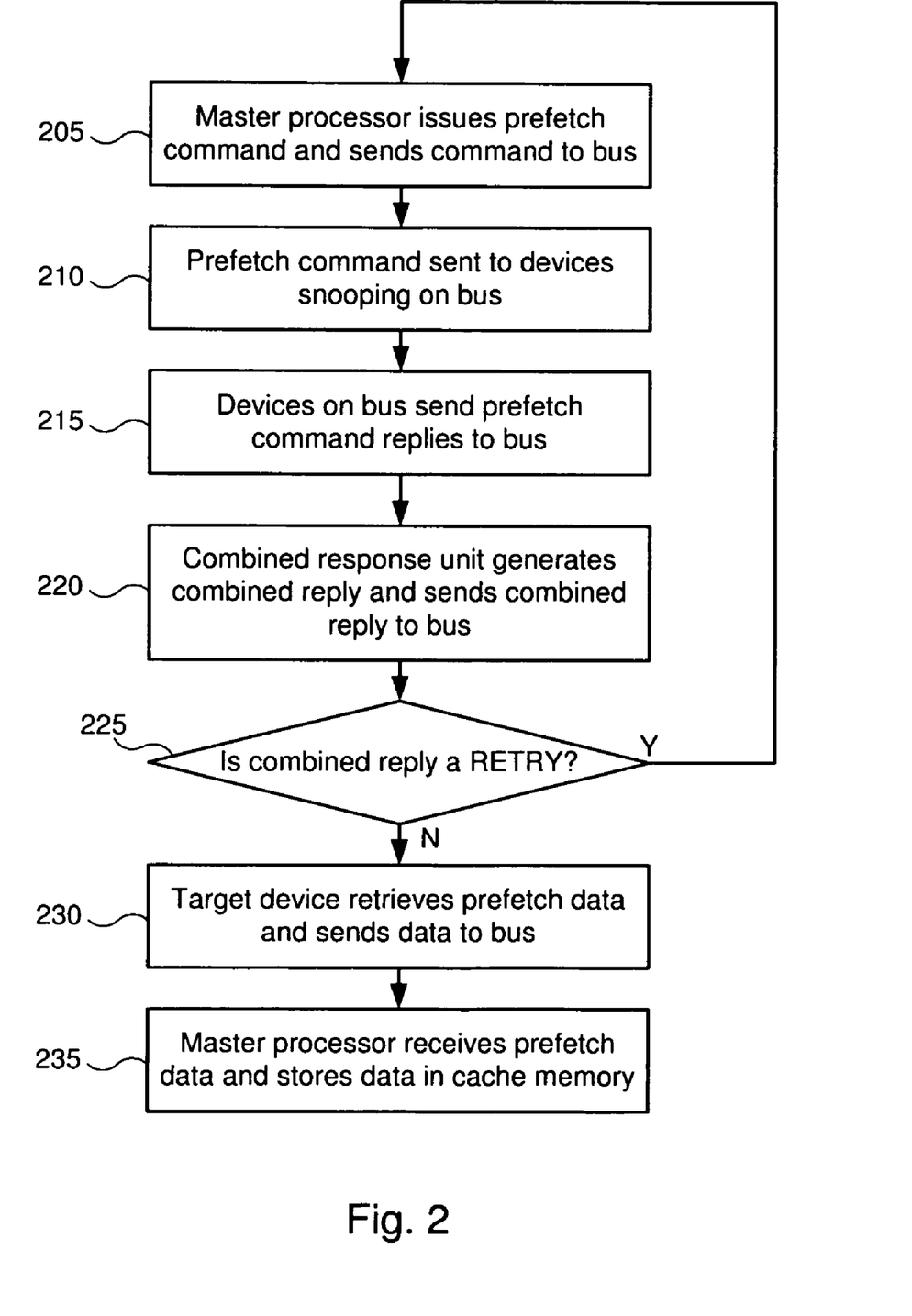
FIG. 2 is a flow diagram illustrating the operation of the multiprocessor system depicted in FIG. 1 in connection with a prefetch transaction.

Referring to FIG. 2, a flow diagram illustrating the operation of the multiprocessor system depicted in FIG. 1 in connection with a prefetch transaction is shown. As noted above, system 100 performs transactions between the various devices coupled to bus 110 in several phases. The first phase in each transaction is the command issuance phase. In this phase, one of the devices issues a command to perform a particular transaction, such as a prefetch. In one embodiment, the command is issued in response to a corresponding instruction in program code that is executed by the processor. This command is communicated by the device to the bus (block 205.)

When a command is communicated by a master device to the bus, the command typically includes an identifier of the transaction type, a tag that is used to identify the communications relating to the command, and various other information that is necessary to complete the transaction (e.g., the address of data to be prefetched.) In one embodiment, the transaction type of a prefetch command is a cache reload. The transaction tag may be any unique identifier that can be used by the devices to distinguish between communications relating to this transaction and communications relating to other transactions.

Each of the devices connected to the bus "snoops" on the bus. That is, each of these devices listens to the bus for commands or other communications that make up the various transactions which are in progress. Each of the devices, including the device that issued the command, therefore detects the prefetch command that was communicated to the bus by the first device (block 210.) Because the command is communicated from the master processor to the bus, and then back to all of the devices which are connected to the bus, it is sometimes said that the command is "reflected" to the devices on the bus.

Depending upon their involvement in the transaction, the devices may take some action to prepare for the transaction to proceed. For example, in the case of a prefetch transaction, a device whose cache memory stores data that is being prefetched may need to prepare a state machine to take some action to maintain the coherency of the data between the different cache memories. As another example, the memory controller may need to prepare a state machine to send the requested prefetch data to the master processor, in case the data cannot be supplied from another processor through intervention.

Each of the devices on the bus then replies to the prefetch command (block 215) that was detected during the command snoop phase. Some of the devices that are connected to the bus are not involved in the prefetch transaction. The devices that are not involved in the transaction reply to the command with a NULL reply, indicating that these devices have no reason to prevent the prefetch transaction from proceeding. Others of the devices may be involved in the prefetch transaction, either directly or indirectly. For example, in the case of the prefetch command, the command is issued by a processor to direct data to be transferred to that processor. One or more source devices that hold the data are potential source devices that may be directly involved in the transaction and will therefore reply to the command with either a RETRY response indicating that the source device is not ready to proceed with the transaction and that it should be attempted at a later time, or a NULL response indicating that the source device is ready to proceed with the transaction. The processor receiving the data is ready to receive the data, so it will send a null reply to the bus.

Some other devices that are connected to the bus may be indirectly involved in the prefetch transaction. For instance, the system may be configured to maintain coherence between separate cache memories that are used by each of the processors in the system, so it may be necessary for processors other than the master and source processors to update data in their own cache memories based upon the data involved in the transaction. In this event, these processors must be ready to accept the data before they can allow the transaction to proceed. If they are ready for the transaction to proceed, they will reply to the command with null replies, indicating that they have no reason to prevent the transaction from proceeding. If they are not ready for the transaction to proceed, they will reply to the command with retry replies, indicating that the transaction should not be allowed to proceed.

Each of the replies to the command has certain attributes. For example, each reply will have an indicator of whether the reply is a RETRY or a NULL reply. The reply may also have a coherency bit which is set if the device sending the reply has data in its cache memory corresponding to the requested prefetch data (i.e., if the device is a potential source device.) The coherency bit may be used to determine from which of the potential source devices the prefetch data will be supplied.

The replies that are sent to the bus by each of the devices are accumulated by the combined response unit. It should be noted that each device is configured to send its reply to the command at a predetermined interval following receipt of the reflected command from the bus. This prevents collisions between the replies. The combined response unit then generates a single reply (referred to herein as an accumulated snoop response) that is based upon the individual replies of the devices. If none of the devices replies with a RETRY, the accumulated snoop response will indicate that the transaction can proceed. If any of the devices replies with a RETRY, then the accumulated snoop response will also be a RETRY. The accumulated snoop response is provided to all of the devices connected to the bus (block 220.) The accumulated snoop response includes the transaction tag, so that the devices will know which transaction corresponds to the accumulated snoop response.

If the accumulated snoop response is a retry (see block 225,) the prefetch transaction cannot proceed. Each of the devices connected to the bus therefore stops processing the transaction. The master processor that sent the command to the bus to initiate the transaction will typically remove the command from a queue of active transactions and place the command in a separate queue which stores commands that will be attempted again at a later time. If the accumulated snoop response is not a RETRY (see block 225,) the transaction will proceed. Any of the devices that need to make preparations for the transaction to proceed will do so.

Typically, the transactions that are carried out on the bus involve the transfer of data from one of the devices to another. For example, in the prefetch transaction, the master processor obtains data to be loaded into its cache memory. The present system supports intervention (the direct transfer of data from one processor to another,) so the prefetch data may be transferred from a source processor to the master processor. Thus, the method of FIG. 2 ends with the source processor sending the requested data to the bus (block 230) and the master processor receiving the data from the bus (block 235.)

Figure 3A:
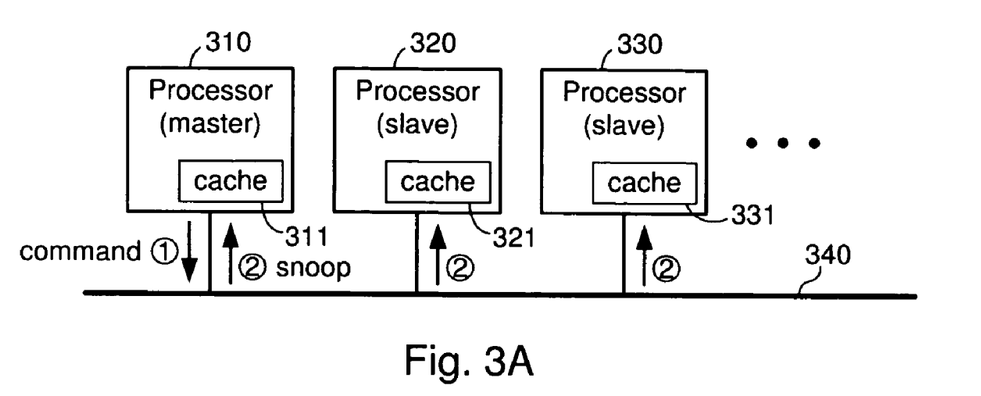
FIGS. 3A-3C are a set of diagrams illustrating the communications associated with the different phases of a prefetch transaction in accordance with one embodiment.
Figure 3B:
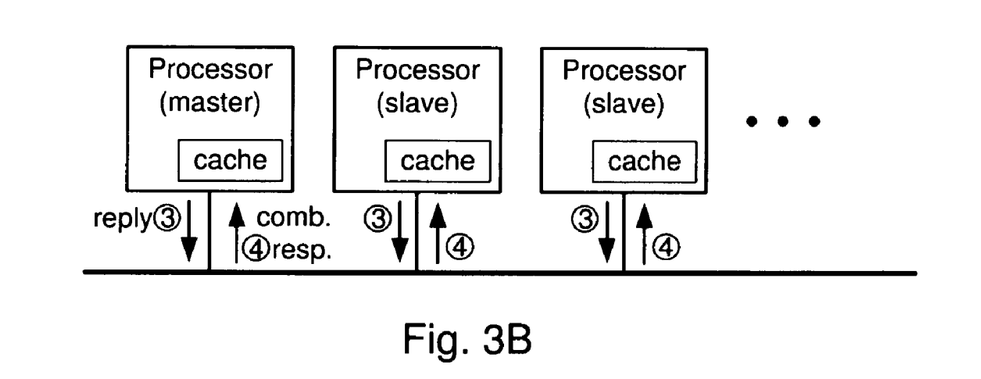
Figure 3C:
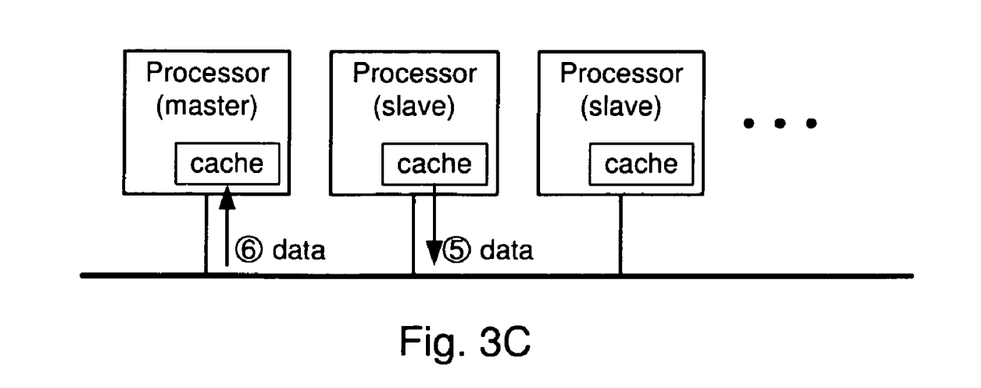

Referring to FIGS. 3A-3C, a set of diagrams illustrating the communications associated with the different phases of a prefetch transaction in accordance with one embodiment are shown. FIG. 3A shows the communications associated with the command issue phase and command snoop phase. FIG. 3B shows the communications associated with the snoop reply phase and the accumulated snoop response phase. FIG. 3C shows the communications associated with the data transfer from a data source to a master processor. For purposes of clarity in FIGS. 3A-3C, the items of FIGS. 3B and 3C are not numbered, but they are identical to the items of FIG. 3A, and references to numbered items in any of these figures refer to the items identified by the corresponding reference numbers in FIG. 3A.

Referring to FIG. 3A, a portion of a system is depicted in which a set of devices including processors 310, 320 and 330 are connected to a bus 340. Each of has a corresponding cache memory (311, 321 and 331, respectively.) The transaction illustrated in FIGS. 3A-3C involves the fetching of data which, in this example, is stored in cache memory 321 of processor 320 and transferring this data to cache memory 311 of processor 310. For the purposes of the illustrated prefetch transaction, processor 310 will be the master device, and processors 320 and 330 will be slave devices.

The first communication involved in the transaction is the issuance of the corresponding command by master processor 310. This command is sent by master processor 310 to bus 340 (as indicated by arrow 1.) The command is then reflected from the bus to each of the devices that is connected to the bus, including master processor 310, source processor 320 and processor 330 (as indicated by arrows 2.)

After receiving the reflected command, each of the devices determines whether it is involved in the corresponding transaction (i.e., whether it holds the requested data) and generates a reply to the command. If necessary, the devices take any action that is needed to prepare for the transaction. Referring to FIG. 3B, the replies of the devices are communicated from the devices to the bus (as indicated by arrows 3.) The replies are processed by the combined response unit, and an accumulated snoop response is sent from the bus to each of the devices (as indicated by arrows 4.)

As noted above, the transaction in this example is a prefetch which will transfer data from cache memory 321 of processor 320 to cache memory 311 of processor 310. Because processor 310 is the device that initiated the transaction, this device is ready for the transaction to proceed, and therefore replies to the reflected command with a NULL reply. Processor 320 is the source device from which data will be retrieved, so this device will reply with either a NULL response or a RETRY response. In this example, it is assumed that processor 320 is ready for the transaction to proceed and therefore replies to the command with a NULL response.

Processor 330 is not directly involved in the transaction, but it may be necessary for this processor to snoop on the transaction for some reason. For example, it may be necessary for processor 330 to store some of the transferred data in its own cache memory in order to maintain coherence between the cache memories of the processors. Processor 330 may therefore reply with either a NULL reply (if this device is ready for the transaction to proceed) or a RETRY reply (if this device is not ready for the transaction to proceed.) It is assumed in this example that processor 330 is ready for the transaction to proceed and therefore sends a NULL reply to the bus. Because the replies from the devices do not include a RETRY response, the combined response unit generates a response which is transmitted to all of the devices in the accumulated snoop response to indicate that all of the devices are ready to proceed with the transaction.

After the accumulated snoop response has been sent from the bus to each of the devices, the transaction is ready to proceed. Processor 320 (the source device) therefore retrieves the data requested in the prefetch command from memory cache 321 and sends the data to the bus (as indicated by arrow 5.) Finally, processor 310 receives the data from the bus (as indicated by arrow 6) and stores this data in memory cache 311. This completes the transaction.

As noted above, while the prefetch transaction allows a processor to preload data into its own cache memory and to thereby make the data more readily accessible by the processor, this transaction is limited in that it can only cause data to be loaded into the cache memory of the processor that issued the command for the transaction. Conventional multiprocessor systems which can perform prefetch transactions do not allow a first processor to cause data to be loaded into the cache memory of a different processor. This limitation can be significant because it is possible in modern multiprocessor systems to directly transfer data from the cache memory of one processor to another processor instead of having to provide this data from memory. This is referred to as intervention. If a first processor cannot cause desired data to be loaded into the cache memory of a different processor, the first processor cannot take full advantage of the intervention capabilities of the system.

The present systems and methods may improve the performance of a multiprocessor system that enables intervention by allowing the first processor to cause the desired data to be loaded into another processor's cache memory. This is referred to in the present disclosure as a preload transaction. The desired data can then be transferred directly from the other processor's cache memory to the first processor through intervention. The latency of the data is thereby reduced, as compared to a scenario in which the data must be transferred to the first processor from memory.

Figure 4:
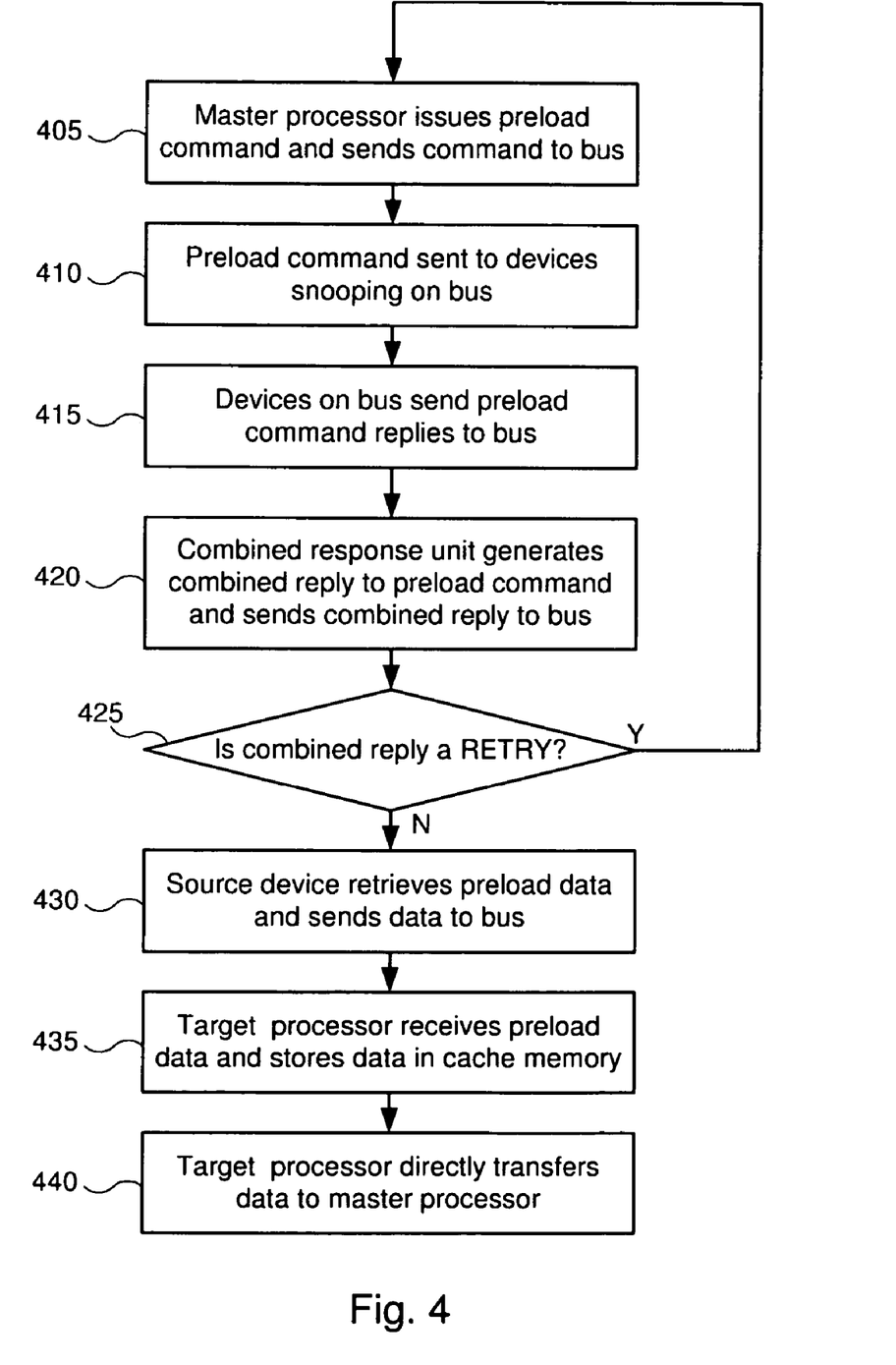
FIG. 4 is a flow diagram illustrating a method by which a first processor can preload data into the cache memory of a different processor in accordance with one embodiment.

Referring to FIG. 4, a flow diagram illustrating a method by which a first processor can preload data into the cache memory of a different processor in accordance with one embodiment is shown. The method of FIG. 4 begins with the issuance of a preload command by one of the processors in a multiprocessor system (block 405.) This processor is the master processor with respect to this preload transaction. The preload command is sent to the bus, which reflects the command back to all of the devices that are connected to the bus (block 410,) including the master processor, a target processor and any other devices connected to the bus.

In one embodiment, the preload command has a dedicated transaction type (i.e., this type is not used with any other types of commands.) The preload command also includes a data address identifying the data to be preloaded, and a transaction tag to identify communications relating to the transaction. In one embodiment, the preload command specifies a particular target device in which the preload data will be stored. In an alternative embodiment, no target device is specified, and the target device is instead selected based upon the replies received from the potential target devices in response to the preload command.

Upon receiving the reflected preload command, each of the devices generates a reply to the command and begins any necessary preparations for processing the corresponding preload transaction. For instance, the target device that will store the preload data and being other devices than they supply this data may need to prepare state machines for the transaction and may need to store information corresponding to the transaction, such as the preload data address and transaction tag.

If the preload command specifies a target device to store the preload data, each of the devices on the bus examines the identifier of the target device to determine whether the target identifier matches the device's own identifier. If the identifiers do not match, the device will not reply with an acknowledgment, but may reply with a RETRY if the device cannot allow the transaction to proceed. If the identifiers match, the device will reply with a NULL if it already stores the identified preload data, with a RETRY if it cannot accept the preload data, or with an acknowledgment otherwise. The replies of the devices may include coherency attributes that are indicated in the same manner as described above with respect to prefetch transactions. If the reply is an acknowledgment, the reply will include the tag that identifies the transaction, which is then used to generate an acknowledgment tag in the combined response.

Each device then sends its reply to the bus (block 415.) As each reply is communicated to the bus, it is received by a combined response unit that is connected to the bus. The combined response unit accumulates the replies from the different devices and, based upon these replies, generates an accumulated snoop response. If the target device replies with an acknowledgment and none of the other devices replies with a RETRY, the accumulated snoop response will be an acknowledgment. If any of the devices replies with a RETRY, the accumulated snoop response will be a RETRY as well. The accumulated snoop response is then sent to the bus, where it is reflected to all of the devices that are connected to the bus (block 420.) It should be noted that an acknowledgment accumulated snoop response includes an acknowledgment tag that indicates the destination of the preload data to the source device, If the accumulated snoop response is a RETRY (block 425,) one of the devices that is either directly or indirectly involved in the preload transaction is not ready to proceed. Consequently, all of the devices on the bus stop processing the transaction. The master processor may remove the command from an active queue and place the command in a queue of commands that will be tried again at a later time (block 405.) If the accumulated snoop response is NULL, the master device likewise does not to proceed with the preload transaction. Upon detecting a NULL or RETRY accumulated snoop response, the devices on the bus will discontinue actions that were begun in anticipation of the preload transaction (e.g., state machines that were prepared for the transaction.) If the accumulated snoop response is an acknowledgment (block 425,) the devices will proceed with the transaction.

In the case of the preload transaction, the source device from which the data is retrieved is selected in the same manner as for the prefetch instruction, and the retrieved data is sent by the selected source device to the bus (block 430) in the same manner as for the prefetch instruction. The data is not received by the master device (the device that issued the preload command,) but is instead received by one of the other processors (block 435.) This other processor stores the received data in its cache memory. Later, when the processor that issued the preload command needs the data, it can be retrieved from the cache memory and transferred directly from the corresponding processor to the processor that issued the preload command (block 440.)

Figure 5A:
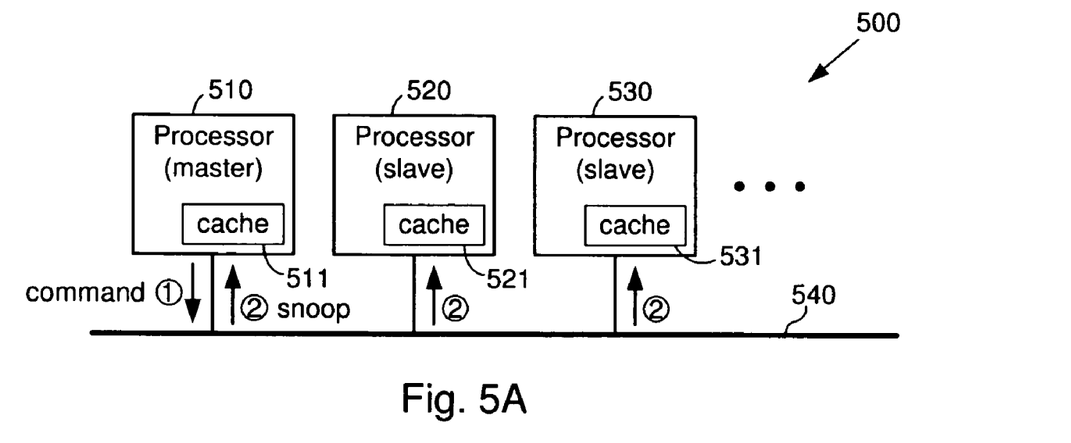
FIGS. 5A-5C are a set of diagrams illustrating the communications associated with the different phases of a preload transaction in accordance with one embodiment.
Figure 5B:
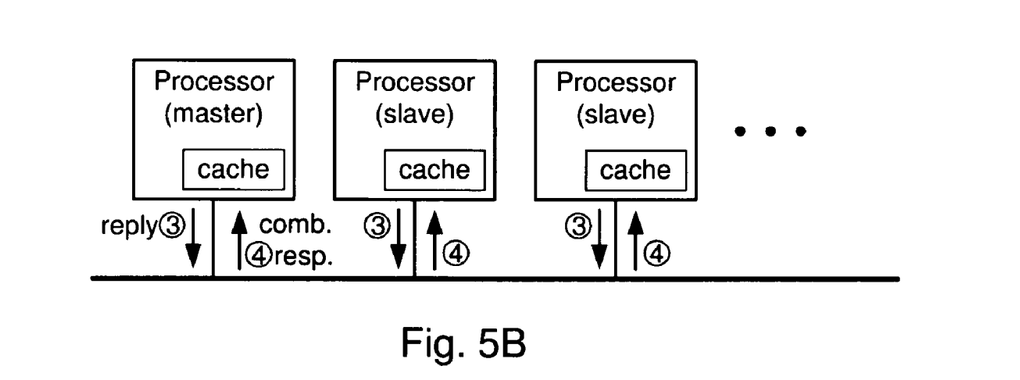
Figure 5C:
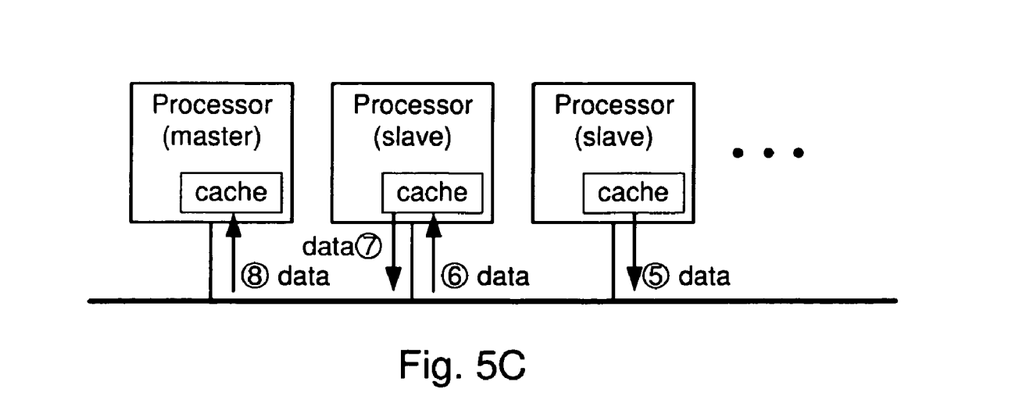

Referring to FIGS. 5A-5C, a set of diagrams illustrating the communications associated with the different phases of a preload transaction in accordance with one embodiment are shown. FIG. 5A shows the communications associated with the command issue and command snoop phases, while FIG. 3B shows the communications associated with the snoop reply and accumulated snoop response phases. FIG. 3C shows the communications associated with the data transfer from a slave processor to a target processor.

Referring to FIG. 5A, system 500 includes a first processor 510, a second processor 520 and a third processor 530, each of which is connected to a bus 540. Processors 510, 520 and 530 each have a corresponding cache memory (511, 521 and 531, respectively.) The preload transaction begins with the communication of a preload command from processor 510 (the master processor) to the bus (as indicated by arrow 1.) All of the devices connected to the bus are snooping on the bus, so the preload command is communicated to each of the devices, including master processor 510 (as indicated by arrows 2.)

Referring to FIG. 5B, each of the devices determines an appropriate response to the command and sends a corresponding reply to the bus (as indicated by arrows 3.) The replies of the individual devices may include an acknowledgment, a NULL reply or a RETRY reply. The individual replies of the devices are accumulated by a combined response unit (not shown in this figure,) which generates a combined reply. As in the previous example, if any of the individual device replies is a RETRY, the combined reply will be a RETRY. If one of the replies is an acknowledgment and the other replies are NULL, the combined reply will be an acknowledgment. The combined reply is then transmitted over bus 540 to each of the devices (as indicated by arrows 4.)

It is assumed for the purposes of this example that the combined reply is an acknowledgment. The devices will therefore proceed with the preload transaction. Referring to FIG. 5C, one of the devices which has the preload data sends the data to the bus (as indicated by arrow 5.) In this example, this device is processor 530, which has the data stored in cache memory 531. In other scenarios, the data may be stored in other devices. The preload data is then received by a target processor (in this case, processor 520,) which stores the data in the corresponding cache memory (in this case, cache memory 521.) This is indicated by arrow 6. It should be noted that the data is not stored in the cache memory of the processor that issued the preload command (processor 510.)

It is expected that, at some time after the preload transaction has been completed, the processor that issued the preload command (processor 510) will need the preload data which is now stored in cache memory 521 of processor 520. As noted above, it is assumed that system 500 supports intervention, so the preload data can be transferred directly from processor 520 to processor 510 when it is needed (as indicated by arrows 7 and 8.)

Numerous variations of the foregoing embodiments may also be possible. For example, in one embodiment, rather than having the master processor specify a particular target processor in which the preload data will be stored, it may be possible for another device to determine the target for the preload transaction. This may be useful because it may be difficult for the master processor to determine which of the slave processors is the best candidate to receive the preload data. If a poor candidate is chosen, the performance of the system may be degraded instead of being improved. The master processor may therefore issue the preload command without identifying a target processor.

In one implementation, the bus may include an arbitrator that is configured to select a target processor for the preload command. The arbitrator may use an arbitration scheme such as round robin selection of the target processor or evaluation of one or more metrics that indicate whether particular processors are better target candidates than others. After the arbitrator has selected a target processor, this information may be communicated to the devices on the bus in various manners. For instance, an identifier of the target processor may be added to the preload command before it is reflected to the devices on the bus, or the target identifier may be added to the accumulated snoop response. If the target identifier is added to the accumulated snoop response, the devices on the bus may be configured so that any of these devices can reply to the preload command with an acknowledgment if the corresponding device can accept the preload data. The arbitrator can then select the target from among those processors that reply with an acknowledgment. It is contemplated that adding the target identifier to the reflected preload command is simpler, but may complete fewer preload transactions, while adding the target identifier to the accumulated snoop response is more complicated, but may complete more of the preload transactions.

Another variation on the foregoing embodiments involves the protection of valuable data that is stored in the cache memory of a slave processor. When preload data is stored in the cache memory of a slave processor, other data that was previously stored in the cache memory may be replaced, or cast out. The replacement of this data in the slave's cache memory may cause the performance of the slave processor to be degraded, thereby possibly degrading the overall performance of the system. Some embodiments may therefore implement a mechanism to protect valuable data that is stored in the slave processor's cache memory. Several such mechanisms are possible. For example, it may be possible to lock one "way" of an n-way set-associative cache and then stored valuable data in the locked way. Alternatively, it may be possible to simply inhibit the preload transaction if it causes data to be cast out of the slave processor's cache. Another alternative would be to inhibit the preload transaction if a slave processor other than the target processor already has the preload data stored in its cache memory.

In an n-way set associative cache, there are n sets of memory locations in the cache in which a particular data value can be stored. The slave processor can be configured to add information to the preload transaction communications which indicate specific sets of the cache in which the preload data can be stored. The preload transaction would then be constrained to store the preload data only in the allowed sets (leaving the other sets protected.) Alternatively, the slave processor may maintain a register indicating which of the sets of the cache are available to store preload data, and which are not.

In regard to the second alternative above, the slave processor may be configured to determine whether a preload transaction will cause data to be cast out of the cache memory, and then simply generate an appropriate reply to the preload command based upon this determination. In other words, if the preload transaction will cause data to be cast out of the cache memory, the slave processor may reply with a RETRY. If the system includes an arbitrator that is configured to select a target processor from among those which reply with an acknowledgment, the slave processor may reply with a NULL if the transaction would cause data to be cast out of its cache memory. The determination of whether data would be cast out could alternatively be restricted to protected sets of a set associative cache.

The third alternative, inhibiting the preload transaction if the preload data is already stored in the cache memory of one of the slave processors, may be easily implemented. In such an embodiment, the slave processors can be configured to reply to the preload command with a RETRY if the preload data is already stored in the respective processor's cache. The transaction would be inhibited by the accumulated snoop response, which would also be a RETRY. In such an embodiment, it would be necessary to configure the master device not to attempt the preload transaction again after receiving the RETRY response, because it would simply continue to get a RETRY each time because the data is already stored in the other processor's cache.

Another variation on the foregoing embodiments would be to initiate a preload transaction based upon data being cast out of a processor's cache memory, rather than a preload program instruction. Because the performance of a processor may be degraded when data is cast out of the corresponding cache memory, it may be useful to store the cast out data in another processor's cache memory. The data would therefore be more readily accessible than if it had to be retrieved from a main memory when needed by one of the processors. The processors could therefore be configured to initiate a preload transaction whenever data is cast out of the corresponding cache memory.

The above embodiments are intended to be implemented in connection with multiprocessor computing systems. Various implementations may be achieved through appropriate programming of software-configurable systems, or through the execution of appropriate software on these systems. This software may be stored on any suitable computer-readable media.

"Computer" and "computer system," as used here, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Those of skill in the art will understand that information and signals may be represented using any of a variety of different technologies and techniques. For example, data, instructions, commands, information, signals, bits, and symbols, that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
a plurality of processors, each of which has a corresponding cache memory; and
a bus coupled to each of the processors;
wherein at least a first one of the processors is configured to issue a preload command to the bus, wherein the preload command directs a target one of the processors which is different from the first one of the processors to load data into the cache memory corresponding to the target processor;
wherein the first one of the processors is configured to issue the preload command in response to data being cast out of the cache memory corresponding to the first processor, wherein the data cast out of the cache memory corresponding to the first processor is the data preloaded into the cache memory corresponding to the target processor; and
wherein the first one of the processors is configured to retrieve the data preloaded into the cache memory corresponding to the target processor and to perform an operation on the data retrieved from the cache memory corresponding to the target processor.

2. The system of claim 1, wherein the first processor is configured to:
receive a preload program instruction directing the first processor to preload data into the cache memory associated with one of the processors other than the first processor; and
issue the preload command to the target processor in response to receiving the preload program instruction.

3. The system of claim 1, wherein the first processor is configured to issue the preload command in response to an event other than receiving a preload instruction.

4. The system of claim 1, wherein the first processor is configured to issue the preload command with an explicit identifier of the target processor.

5. The system of claim 1, wherein the first processor is configured to issue the preload command without an explicit identifier of the target processor.

6. The system of claim 5, wherein the target processor is selected by an arbitrator which is coupled to the bus, wherein the arbitrator is configured to perform bus arbitration and wherein the arbitrator is separate from the first processor.

7. The system of claim 6, wherein each of the processors other than the first processor is configured to respond to the preload command as if the processor is the target processor, and wherein the arbitrator is configured to select the target processor from among a set of processors that are available to accept the data, as indicated by the processors' responses to the preload command.

8. The system of claim 1, wherein the system is configured to support intervention.

9. A system comprising: a first processor; and a first cache memory corresponding to the first processor; wherein the first processor is configured to operate in a slave mode, wherein when the first processor is in the slave mode, the first processor is configured to load data into the first cache memory in response to a preload command issued by a second processor which is different from the first processor; wherein the second processor issues the preload command in response to data being cast out of a second cache memory corresponding to the second processor, wherein the data cast out of the second cache memory is the data loaded into the first cache memory; and wherein the first processor is configured to transfer data from the first cache memory directly to the second processor in response to a request from the second processor for the data.

10. The system of claim 9, wherein the first processor is configured to operate in a master mode, wherein when the first processor is operating in the master mode, the first processor is configured to issue a preload command which directs a third processor to load data into a cache memory corresponding to the third processor.

11. A method implemented in a system having a plurality of processors coupled to a bus and a plurality of cache memories, wherein each cache memory is associated with a different one of the plurality of processors, the method comprising:
issuing a preload command from a first processor having a first cache memory, wherein the preload command directs storage of data in a target cache memory associated with a target processor which is different from the first processor, wherein the first processor issues the preload command in response to data being cast out of the first cache memory; and
storing the data in the target cache memory in response to the preload command, wherein the cast out of the cache memory corresponding to the first processor is the data preloaded into the cache memory corresponding to the target processor; and
the first processor retrieving the data preloaded into the cache memory corresponding to the target processor and performing an operation on the data retrieved from the cache memory corresponding to the target processor.

12. The method of claim 11, further comprising the first processor receiving a preload program instruction directing the first processor to preload data into the cache memory associated with one of the processors other than the first processor and the first processor issuing the preload command to the target processor in response to receiving the preload program instruction.

13. The method of claim 11, wherein the first processor issues the preload command in response to an event other than receiving a preload instruction.

14. The method of claim 11, wherein the first processor issues the preload command with an explicit identifier of the target processor.

15. The method of claim 11, wherein the first processor issues the preload command without an explicit identifier of the target processor.

16. The method of claim 15, further comprising arbitrating the bus using an arbitrator which is coupled to the bus selecting the target processor and which is separate from the first processor.

17. The method of claim 16, further comprising each of the processors other than the first processor responding to the preload command as if the processor is the target processor, and the arbitrator selecting the target processor from among a set of processors that are available to accept the data, as indicated by the processors' responses to the preload command.

18. The method of claim 11, further comprising the target processor storing the data in the target cache memory and, at some time after the data is stored in the target cache memory, transferring the data directly to the first processor through intervention.

19. The system of claim 1, wherein the first processor is further configured to load the data from the cache memory of the target processor into the first processor and to execute one or more program instructions using the data from the cache memory of the target processor.

20. The method of claim 11, further comprising:
   loading the data from the target cache memory into the first processor; and
   executing one or more program instructions in the first processor using the data from the target cache memory.

* * * * *